United States Patent
Anseth et al.

(10) Patent No.: US 12,025,901 B2
(45) Date of Patent: Jul. 2, 2024

(54) ELECTROPHORETIC CORE-SHELL PARTICLES HAVING AN ORGANIC PIGMENT CORE AND A SHELL WITH A THIN METAL OXIDE LAYER AND A SILANE LAYER

(71) Applicant: E INK CORPORATION, Billerica, MA (US)

(72) Inventors: Jay William Anseth, Canton, MA (US); Brandon MacDonald, Melrose, MA (US); Craig Alan Breen, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 682 days.

(21) Appl. No.: 17/156,911

(22) Filed: Jan. 25, 2021

(65) Prior Publication Data

US 2021/0247658 A1    Aug. 12, 2021

Related U.S. Application Data

(60) Provisional application No. 62/970,901, filed on Feb. 6, 2020.

(51) Int. Cl.
*G02F 1/1675* (2019.01)
*C09B 67/08* (2006.01)
*G02F 1/167* (2019.01)

(52) U.S. Cl.
CPC ........ *G02F 1/1675* (2019.01); *C09B 67/0007* (2013.01); *G02F 1/167* (2013.01);
(Continued)

(58) Field of Classification Search
CPC ............. G02F 1/1675; G02F 1/167; G02F 2001/1678; G02F 2202/022; G02F 2202/28; C09B 67/0007
See application file for complete search history.

(56) References Cited

U.S. PATENT DOCUMENTS

| 4,418,346 A | 11/1983 | Batchelder |
| 4,986,015 A | 1/1991 | Ackeret |

(Continued)

FOREIGN PATENT DOCUMENTS

| JP | 2006066503 A | 3/2004 |
| KR | 20130078094 A | 7/2013 |

OTHER PUBLICATIONS

Korean Intellectual Property Office, "International Search Report and Written Opinion", PCT/US2021/014863, May 17, 2021.

(Continued)

*Primary Examiner* — Stewart A Fraser
(74) *Attorney, Agent, or Firm* — Ioannis Constantinides

(57) ABSTRACT

An electrophoretic medium comprises a plurality of core-shell particles and a non-polar fluid. The core-shell particles comprise an organic pigment particles core and a shell comprising a metal oxide layer and a silane layer. The metal oxide layer may have a thickness of 0.4 to 2 nm. It may be formed using a fluidized bed reactor by inserting the organic pigment into the reactor as a powder bed, contacting the powder bed with a gaseous stream comprising a metal oxide precursor and an inert gas, and contacting the powder bed with a gaseous stream of a reagent and an inert gas. The silane layer is formed from a silane compound comprising a first functional group, wherein the first functional group reacts with the metal oxide.

14 Claims, 4 Drawing Sheets

(52) U.S. Cl.
CPC ............. *G02F 2001/1678* (2013.01); *G02F 2202/022* (2013.01); *G02F 2202/28* (2013.01)

(56) References Cited

U.S. PATENT DOCUMENTS

| | | | |
|---|---|---|---|
| 5,763,548 A | 6/1998 | Matyjaszewski et al. |
| 5,789,487 A | 8/1998 | Matyjaszewski et al. |
| 5,807,937 A | 9/1998 | Matyjaszewski et al. |
| 5,872,552 A | 2/1999 | Gordon, II et al. |
| 5,945,491 A | 8/1999 | Matyjaszewski et al. |
| 6,069,205 A | 5/2000 | Wang |
| 6,071,980 A | 6/2000 | Guan et al. |
| 6,111,022 A | 8/2000 | Matyjaszewski et al. |
| 6,121,371 A | 9/2000 | Matyjaszewski et al. |
| 6,124,411 A | 9/2000 | Matyjaszewski et al. |
| 6,130,774 A | 10/2000 | Albert et al. |
| 6,137,012 A | 10/2000 | Fagan et al. |
| 6,144,361 A | 11/2000 | Gordon, II et al. |
| 6,153,705 A | 11/2000 | Corpart et al. |
| 6,162,882 A | 12/2000 | Matyjaszewski et al. |
| 6,172,798 B1 | 1/2001 | Albert et al. |
| 6,184,856 B1 | 2/2001 | Gordon, II et al. |
| 6,191,225 B1 | 2/2001 | Barkac et al. |
| 6,197,883 B1 | 3/2001 | Schimmel et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,822,782 B2 | 11/2004 | Honeyman |
| 6,866,760 B2 | 3/2005 | Paolini, Jr. et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,339,715 B2 | 3/2008 | Webber et al. |
| 7,352,502 B2 | 4/2008 | Miyazaki et al. |
| 7,411,719 B2 | 8/2008 | Paolini, Jr. et al. |
| 7,453,445 B2 | 11/2008 | Amundson |
| 7,535,624 B2 | 5/2009 | Amundson et al. |
| 7,679,814 B2 | 3/2010 | Paolini, Jr. et al. |
| 7,715,088 B2 | 5/2010 | Liang et al. |
| 7,799,618 B2 | 9/2010 | Kawase et al. |
| 7,839,564 B2 | 11/2010 | Whitesides et al. |
| 8,009,348 B2 | 8/2011 | Zehner et al. |
| 8,018,640 B2 | 9/2011 | Whitesides et al. |
| 8,199,395 B2 | 6/2012 | Whitesides et al. |
| 8,786,929 B2 | 7/2014 | LeCain et al. |
| 9,279,906 B2 | 3/2016 | Kang |
| 9,372,380 B2 | 6/2016 | Du et al. |
| 9,446,965 B2 | 9/2016 | Kverel et al. |
| 9,697,778 B2 | 7/2017 | Telfer et al. |
| 9,921,451 B2 | 3/2018 | Telfer et al. |
| 10,444,553 B2 | 10/2019 | Laxton |
| 10,599,005 B2 | 3/2020 | Duthaler et al. |
| 10,782,586 B2 | 9/2020 | Liu et al. |
| 2014/0226198 A1* | 8/2014 | Anseth ............... G02B 26/026 359/267 |
| 2015/0005720 A1 | 1/2015 | Zang |
| 2016/0012710 A1 | 1/2016 | Lu et al. |
| 2017/0253741 A1 | 9/2017 | Kim et al. |
| 2018/0210312 A1* | 7/2018 | Liu ................... G02F 1/16757 |
| 2018/0363136 A1 | 12/2018 | Spencer, II |

OTHER PUBLICATIONS

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Wang, J.S. et al; "Controlled/'Living' Radical Polymerization. Halogen Atom Transfer Radical Polymerization Promoted by a Cu(I)/Cu(II) Redox Process"; Macromolecules, vol. 28, No. 23; pp. 7901-7910 (1995).

Beers, K. et al; "Atom Transfer Radical Polymerization of 2-Hydroxyethyl Methacrylate"; Macromolecules, vol. 32, No. 18; pp. 5772-5776 (1999).

Wilson, C.A. et al., "Nucleation and Growth during Al2O3 Atomic Layer Deposition on Polymers", Chem. Mater., vol. 17, No. 23, pp. 5625-5634, (2005).

Guo, Jing et al., "Suppressing the Photocatalytic Activity of TiO2 Nanoparticles by Extremely Thin Al2O3 Films Grown by Gas-Phase Deposition at Ambient Conditions", Nanomaterials, 2018, 8, 61, Jan. 24, 2018.

Wen, Ziqiang et al., "Fabrication of diarylide yellow pigments/modified SiO2 core-shell hybrid composite particles for electrophoretic displays", Current Applied Physics, vol. 12, pp. 259-265 (2012).

European Patent Office, "Extended European Search Report", EP Appl. No. 21751432.2 , Feb. 14, 2024. Feb. 14, 2024.

Van Ommen, J. Ruud et al., "Fluidization of nanopowders: a review", J. Nanopart Res, vol. 14, No. 737, pp. 1-29 (2012).

Heinz, Hendrik et al., "Nanoparticle decoration with surfactants: Molecular interactions, assembly, and applications", Surface Science Reports, vol. 72, pp. 1-58 (2017).

* cited by examiner

ELECTROPHORETIC CORE-SHELL PARTICLES HAVING AN ORGANIC PIGMENT CORE AND A SHELL WITH A THIN METAL OXIDE LAYER AND A SILANE LAYER

CROSS-REFERENCE TO RELATED APPLICATION

This application claims priority to and the benefit of the U.S. Provisional Application having Ser. No. 62/970,901 filed on Feb. 6, 2020, the content of which is incorporated by reference herein in its entirety.

FIELD OF THE INVENTION

This invention relates to organic pigments used in electrophoretic display media. More specifically, in one aspect this invention relates to electrophoretic systems containing core-shell organic pigment particles having a shell comprising a thin metal oxide layer and a silane layer.

BACKGROUND OF INVENTION

This invention relates to particles for use in electrophoretic displays, and to electrophoretic media and displays incorporating such particles. More specifically, the invention relates to an electrophoretic medium comprising a plurality of core-shell particles and a non-polar liquid. In one aspect, the core-shell particles comprise (a) a core comprising an organic pigment and (b) a shell comprising a metal oxide layer and a silane layer, wherein the metal oxide layer is formed by deposition of a metal oxide onto the organic pigment surface using a fluidized bed reactor.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 6,822,782; 7,002,728; 7,679,814; 8,018,640; 8,199,395; and 9,372,380; and U.S. Patent Application Publication No. US2018/0210312;

(b) Capsules, binders and encapsulation processes; see for example U.S. Pat. Nos. 6,922,276; and 7,411,719;

(c) Microcell structures, wall materials, and methods of forming microcells; see for example U.S. Pat. Nos. 7,072,095; and 9,279,906;

(d) Methods for filling and sealing microcells; see for example U.S. Pat. Nos. 7,144,942; and 7,715,088;

(e) Films and sub-assemblies containing electro-optic materials; see for example U.S. Pat. Nos. 6,982,178; and 7,839,564;

(f) Backplanes, adhesive layers and other auxiliary layers and methods used in displays; see for example U.S. Pat. Nos. 7,116,318; 7,535,624; (g) Color formation and color adjustment; see for example U.S. Pat. Nos. 7,075,502 and 7,839,564;

(h) Methods for driving displays; see for example U.S. Pat. Nos. 7,012,600; and 7,453,445;

(i) Applications of displays; see for example U.S. Pat. Nos. 7,312,784; 8,009,348;

(j) Non-electrophoretic displays, as described in U.S. Pat. No. 6,241,921; and 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

However, the service life of encapsulated electrophoretic displays is still lower than is altogether desirable. It appears that this service life is limited by factors such as the tendency of particles to aggregate into clusters, which prevent the particles completing the movements necessary for switching of the display between its optical states. The physical properties and surface characteristics of electrophoretic particles can be modified by adsorbing various materials onto the surfaces of the particles, or chemically bonding various materials to these surfaces. For example, in an electrophoretic display that contains organic pigments, monomers having different chemical groups may form polymer coatings on the pigments by dispersion polymerization and the coatings may interact with a charge control agent to provide colored particles of varying charge strength. An analogous approach for achieving improved electro-optic performance is the use of organic pigment particles coated with a metal oxide, such as silica. The silica coating enables the covalent attachment of other materials on the pigment particle surface, creating stable, differentiated surfaces among the different types of electrophoretic particles in a medium. A typical method of silica precipitation onto organic pigment particles involves the reaction of hydrolysable silicone materials, such as triethoxysilane, with water in an organic solvent and in the presence of the organic pigment particles. Absent a very tight control of the conditions of the process, the coating is not uniform with areas of no coverage and areas of a thicker silica coating. This may lead to less efficient particle separation and to a reduction of the color properties of the organic pigment. Thus, there is a need for improved electrophoretic particles and processes of making thereof.

SUMMARY OF INVENTION

According to one aspect of the present invention, an electrophoretic medium comprises a plurality of a first type of core-shell particles and a non-polar fluid. Each of the plurality of the first type of the core-shell particles comprises a core, comprising an organic pigment, and a shell. The shell comprises a metal oxide layer and a silane layer. The thickness of the metal oxide layer is from about 0.4 nm to about 2 nm. The silane layer is formed from a silane compound comprising a first functional group, wherein the first functional group reacts with the metal oxide. The electrophoretic medium may further comprise a plurality of a second type of core-shell particles or another type of charged electrophoretic particles. The electrophoretic medium may also comprise more than two types of core-shell particles or other types of charged electrophoretic particles. This electrophoretic medium can be used in an electrophoretic device that comprises a first light-transmissive electrode layer, an electro-optic material layer, and a second electrode layer. The electro-optic material layer of the electrophoretic device comprises encapsulated electrophoretic medium, that is, microcapsules or microcells containing particles in a fluid. The electrophoretic medium can also be used in electrophoretic assemblies such as front plane laminates, inverted front plane laminates, and double release sheets.

According to another aspect of the present invention, an electrophoretic medium comprises a plurality of a first type of core-shell particles and a non-polar fluid. Each of the plurality of the first type of the core-shell particles comprises a core, comprising an organic pigment, and a shell. The shell comprises a metal oxide layer and a silane layer. The metal oxide layer is formed on the surface of the organic pigment using a fluidized bed reactor by inserting the organic pigment into the reactor as a powder bed, contacting the powder bed with a gaseous stream comprising an inert gas and a metal oxide precursor, and contacting the powder bed with a gaseous stream of an inert gas and a reagent that reacts with the metal oxide precursor to form a metal oxide. The electrophoretic medium may further comprise a plurality of a second type of core-shell particles or another type of charged electrophoretic particles. The electrophoretic medium may also comprise more than two types of core-shell particles or other types of charged electrophoretic particles. This electrophoretic medium can be used in an electrophoretic device that comprises a first light-transmissive electrode layer, an electro-optic material layer, and a second electrode layer. The electro-optic material layer of the electrophoretic device comprises encapsulated electrophoretic medium, that is, microcapsules or microcells containing particles in a fluid. The electrophoretic medium can also be used in electrophoretic assemblies such as front plane laminates, inverted front plane laminates, and double release sheets.

According to another aspect of the present invention, the shell of the core-shell particles further comprises a polymer stabilizer layer. The polymer stabilizer layer may be formed from the reaction of the silane layer and a monomer or macromonomer, wherein the silane compound used for the formation of the silane layer comprises a third functional group and the monomer or macromonomer comprises a fourth functional group. The polymer stabilizer layer is formed by the reaction between the third and fourth functional groups.

According to another aspect of the present invention, a method of manufacturing of an electrophoretic medium comprising a plurality of core-shell particle and a non-polar fluid comprising the steps of (a) providing organic pigment particles; (b) introducing the organic pigment particles into a fluidized bed reactor as a powder bed; (c) contacting the powder bed with a gaseous stream comprising an inert gas and a precursor of metal oxide; (d) contacting the powder bed with a gaseous stream comprising a reagent to form organic pigment particles having a metal oxide layer on its surface, wherein the reagent is selected from the group consisting of water, oxygen, ozone, and mixtures thereof; (e) reacting the organic pigment particles having a metal oxide layer with a silane compound in an organic solvent to form a silane layer, wherein the silane compound comprises a first functional group and a third functional group, wherein the first functional group reacts with the metal oxide to form organic pigment particles comprising a metal oxide layer and a silane layer; and (f) combining the plurality of core-shell particles and the non-polar fluid. The gaseous stream comprising the reagent may further comprise an inert gas.

BRIEF DESCRIPTION OF THE FIGURES

Various aspects and embodiments of the application will be described with reference to the following figures. It should be appreciated that the figures are not necessarily drawn to scale.

DETAILED DESCRIPTION

Figure 1A:
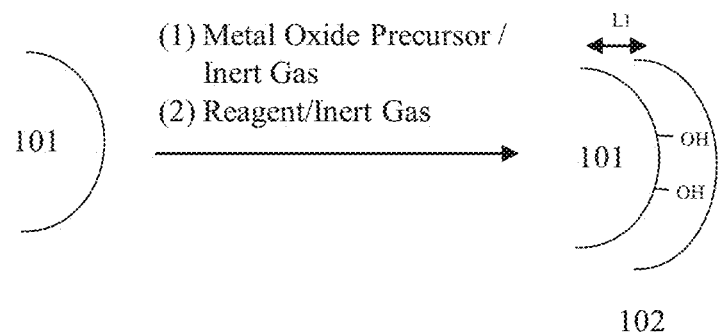
FIG. 1A shows the reaction scheme for the formation of a core-shell particle comprising an organic pigment core and a shell comprising a metal oxide layer.

The present invention provides an electrophoretic medium comprising a plurality of a plurality of core-shell particles and a non-polar fluid. The core-shell particles comprise an organic pigment core and a shell comprising a metal oxide layer and a silane layer. The shell may also comprise a polymer stabilizer layer. This layer, if it is present, is located at the surface of the core-shell particle and it contributes to the dispersion stability of the particles in the electrophoretic medium.

The electrophoretic medium of the present invention may be incorporated into an electro-optic display. A typical electro-optic display, comprising an electrophoretic medium, also comprises a first (front) electrode and a second (rear) electrode. The first electrode is light-transmissive. The second electrode may be also light-transmissive, or it may be not light-transmissive. The electrophoretic medium comprising a plurality of charged particles in a non-polar fluid is typically positioned between the front and rear electrodes.

The electrophoretic medium may contain one or more types of particles, which may have different color and charges. For example, there are commercial electro-optic displays that comprise electrophoretic medium having oppositely charged white and black particles. However, displays comprising one or more types of charged organic particles also exist in the market. The use of organic pigments is preferred because they provide brighter and more saturated color in comparison to inorganic pigments. Typical organic pigments used in electro-optic displays may have cyan, magenta, yellow, red, green, blue, and black color. Non-limiting examples of organic pigment types include azo, phthalocyanine, quinacridone, perylene, diketopyrrolopyrrole, benzimidazolone, isoindoline, anthranone, indanthrone, rhodamine, benzinamine, and carbon black types. Although many practitioners consider carbon black pigment as an inorganic pigment, this type of pigment is considered an organic pigment for the purpose of the present patent application, as some of its physical characteristics, such as hydrophobicity, surface area, etc., resemble those of an organic pigment. Non-limiting examples of specific organic pigments that may be used in electrophoretic media include C.I. Pigment Blue 15, 15:1, 15:2, 15:3, 15:415:6, 60, and 79; Pigment Red 2, 4, 5, 9, 12, 14, 38, 48:2, 48:3, 48:4, 52:2, 53:1, 57:1, 81, 112, 122, 144, 146, 147, 149, 168, 170, 176, 177, 179, 184, 185, 187, 188, 208, 209, 210, 214, 242, 254, 255, 257, 262, 264, 282, and 285; C.I. Pigment Violet 1, 19, 23, and 32; C.I. Pigment Yellow 1, 3, 12, 13, 14, 15, 16, 17, 73, 74, 81, 83, 97, 109, 110, 111, 120, 126, 127, 137, 138, 139, 150, 151, 154, 155, 174, 175, 176, 180, 181, 184, 191, 194, 213 and 214; C.I. Pigment Green 7, and 36; C.I. Pigment Black 1, and 7; C.I. Pigment Brown 25, 32, 41; Pigment Orange 5, 13, 34, 36, 38, 43, 61, 62, 64, 68, 67, 72, 73, and 74.

The organic pigment of the core of the core-shell particles of the present invention may have average diameter from 1 nm up to about 100 µm, or from 50 nm to 1 µm, or from 60 nm to 800 nm.

Organic pigment provide color because they absorb specific wavelengths of incident light that correspond to visible light. Typically, their color saturation and strength increases with decreasing particle size (that is, with increasing surface area). Thus, they are mostly available as relatively high surface area particles, which make them relatively difficult to disperse and stabilize in liquid carriers.

According to one embodiment of the present invention, an electrophoretic medium comprises a plurality of a first type of core-shell particles and a non-polar fluid. The core comprises an organic pigment, and the shell comprises a metal oxide layer and a silane layer.

The metal oxide layer is formed on the surface of the organic pigment using a fluidized bed reactor by inserting the organic pigment into the reactor as a powder bed, contacting the powder bed with a gaseous stream comprising an inert gas and a metal oxide precursor, and contacting the powder bed with a gaseous stream of an inert gas and a reagent. The reagent reacts with the metal oxide precursor to form a metal oxide.

A continuous or a batch process may be used in the fluidized bed reactor. A typical fluidized bed reactor comprises a chamber that enable the intimate mixing of powder materials with gaseous phase reagents in order to improve both the reaction rate and the uniformity of the modified powder surfaces. The pigment powder can be placed on a porous plate as a powder bed inside the reactor and positioned vertically. A gaseous stream of the metal oxide precursor/inert gas can be injected from an inlet at the top or at the bottom of the chamber of the reactor. For example, a gaseous stream of trimethyl aluminum in nitrogen gas may be used. The bed may be continuously vibrated. In addition, the gas pressure may drop because of the resistance from the powder bed, which may also cause continuous movement of the powder and suspension of the powder in the gas stream, improving the contact between the surface of the powder and the reagent. The metal oxide precursor may be complexed (or adsorbed) on the surface of the powder in a thin layer. The gaseous stream may then be changed from the metal oxide precursor to a reagent/inert gas stream, for example water/nitrogen. This gaseous stream will cause the reaction of the thin film of the metal oxide precursor with the reagent, forming a thin layer on the surface of the powder. In a continuous process using a horizontal fluidized bed reactor, the powder bed may be continuously transported from one side of the chamber to the other, passing through the separate zones, where the powder is exposed to separate gaseous streams (the metal oxide precursor/nitrogen stream and then the reagent/nitrogen stream). It is possible to include a separate stream before the delivery of the surface-treated powder from the outlet of the fluid bed reactor, which may cause the removal of the excess reagent, for example, the drying of the pigment powder. An example of a continuous process is provided in U.S. Patent Application No. US2018/0363136 by ALD Nanosolutions, Inc.

Figure 1B:
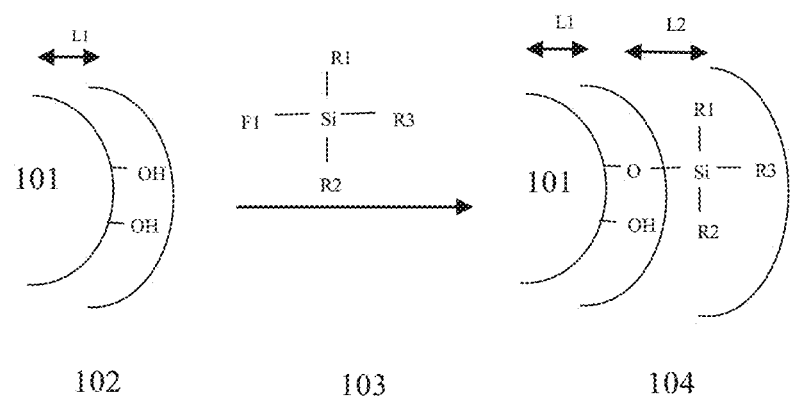
FIG. 1B shows the reaction scheme for the formation of a core-shell particle comprising an organic pigment particle core and a shell comprising a metal oxide layer and a silane layer.

FIG. 1A illustrates the reaction scheme by which the metal oxide layer is formed on the surface of an organic pigment particle 101. A gaseous stream of a metal oxide precursor in an inert gas is brought into contact with a powder bed of organic pigment particles 101. The precursor is complexed or adsorbed on the surface of the organic pigment particle and it reacts with a subsequent gaseous steam of a reagent in an inert gas to form a metal oxide layer 102, having a layer thickness of L1. Particle 102 (organic pigment particle having a metal oxide layer on its surface) is then reacted with a silane compound 103 as shown in FIG. 1B. This silane has a substituent F1 comprising a first functional group, which can react with the metal oxide surface to provide a core-shell particle 104. The core-shell particle 104 has a metal oxide layer with a thickness L1 and a silane layer with a thickness of L2. The silicon atom of the silane compound also has substituents R1, R2, and R3. One or two of these substituents may also be substituent F1, comprising a first functional group, which may also react with the metal oxide surface. At least one of R1, R2, and R2 may comprise a second functional group that may provide a charge to the particle or it can modify a surface characteristic of the core-shell particle such as its surface energy.

The metal oxide layer may comprise aluminum oxide, silica, titanium dioxide, zirconium oxide, zinc oxide or mixtures thereof.

Non-limiting examples of a metal oxide precursors are trimethylaluminum, triethylaluminum, dimethylaluminum chloride, diethylaluminum chloride, trimethoxyaluminum, triethoxyaluminum, dimethylaluminum propoxide, aluminum triisopopoxide, tributoxy aluminum, tris(dimethylamino) aluminum, tris(diethylamino) aluminum, tris(propylamino) aluminum, aluminum trichloride, trichlorosilane, hexachlorodisilane, silicon tetrachloride, tetramethoxysilane, tetraethoxysilane, tris(tert-pentoxy)silanol, tetraisocyanatesilane, silicon tertrachoride, tris(methylamino)silane, tris(ethylamino)silane, titanium tetrachloride, titanium tetraiodide, tetramethoxy titanium, tetraethoxy titanium, titanium isopropoxide, tetrakis(methylamino) titanium, tetrakis(ethylamino) titanium, dimethyl zinc, diethyl zinc, methyl zinc isopropoxide, zirconium tetrachloride, zirconium tetraiodide, tetramethoxy zirconium, tetraethoxy zirconium, tetraisopropoxy zirconium, tetrabutoxy zirconium, tetrakis(methylamino) zirconium, tetrakis(ethylamino) zirconium, and mixtures thereof. The metal oxide precursors are supplied by Sigma-Aldrich.

Non-limiting examples of reagents are water, oxygen, ozone, and mixture thereof.

The metal oxide layer may have thickness of from about 0.4 nm to about 2 nm, or from about 0.5 nm to about 1 nm, or from about 0.5 nm to about 0.8 nm.

Non-limited examples of a second functional group of the silane layer that may provide a charge to the core-shell particle or that may modify a surface feature of the core-shell particles are alkyl group, a halogenated alkyl group, an alkenyl group, an aryl group, a hydroxy group, a carboxy group, a sulfate group, a sulfonate group, a phosphate group, a phosphonic group, an amine group, a quaternary ammonium group, a dimethylsiloxane group, an ester group, an amide group, and ethylenimine group.

Non-limiting examples of first functional groups of the silane compound that may react with the metal oxide layer are alkoxy, alkylamino, halide, hydrogen, and hydroxy. This means that a silicon atom of the silane may be connected to an alkoxy group, an alkylamino group, a halide group, a hydrogen group (Si—H), and a hydroxy group, respectively.

An example of a class a silane compound for bonding to the metal oxide of the metal oxide layer is trialkoxy silane coupling groups, such as 3-(trimethoxysilyl)propyl methacrylate, which is available commercially from Dow Chemical Company, Wilmington, Del. under the trade name Z6030. The corresponding acrylate may also be used.

According to second embodiment of the present invention, an electrophoretic medium comprises a core-shell particles and a non-polar fluid, wherein the core comprises an organic pigment, and the shell comprises a metal oxide layer, a silane layer, and a polymer stabilizer layer. The metal oxide layer is formed on the surface of the organic pigment using a fluidized bed reactor. The silane compound that is used to form the silane layer may comprise a first and a third functional groups. The first functional group can react with the metal oxide layer to form the silane layer. This silane layer may then be reacted via the third functional group with a monomer or a macromonomer comprising a fourth functional group to form a polymer stabilizer layer.

Figure 1C:
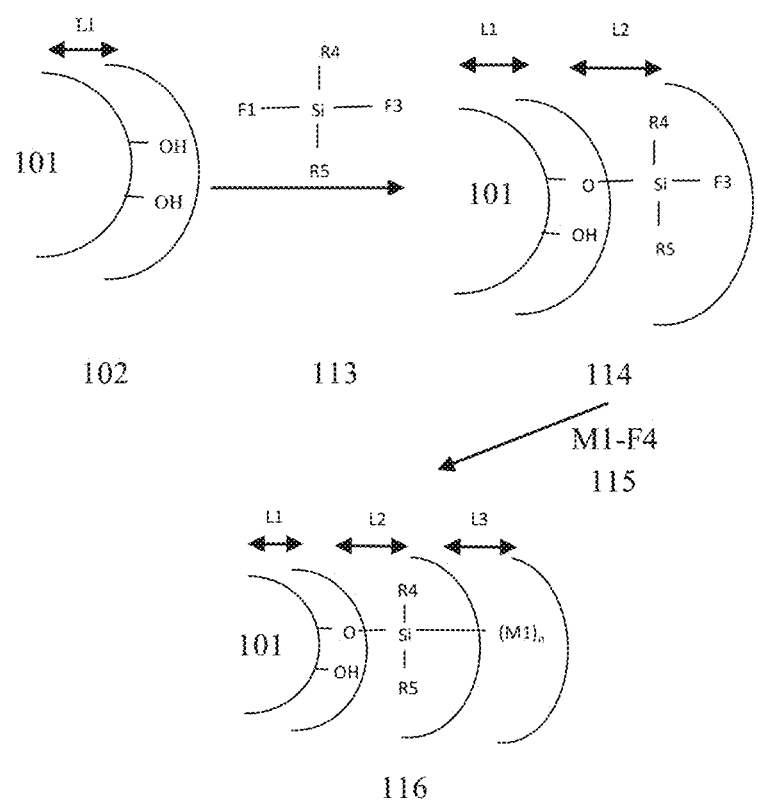
FIG. 1C shows the reaction scheme for the formation of a core-shell particle comprising an organic pigment core and a shell comprising a metal oxide layer, a silane layer, and a polymer stabilizer layer.

FIG. 1C illustrates this series of reactions towards the formation of core-shell particles 116, wherein the core comprises an organic pigment and the shell comprises a metal oxide layer, a silane layer, and a polymer stabilizer layer. More specifically, the particle 102 comprising a core (organic pigment 101) and a metal oxide layer with thickness of L1, may react with a silane compound 113, comprising a substituent F1 having a first functional group and a substituent F3 having a third functional group. The first functional group may react with the metal oxide layer of particle 102 to form a core-shell particle 114. This core of core-shell particle comprises an organic pigment, and the shell comprises a metal oxide layer with thickness L1 and a silane layer with thickness L2. Particle 114 may react via a third functional group in substituent F2 with a monomer (or macromonomer M1-F4 to form a core-shell particle 115 comprising a shell having a metal oxide layer with thickness L1, a silane layer with thickness L2, and a polymer stabilizer layer with thickness L3. The polymer stabilizer layer is formed by the reaction of the third functional group in the silane substituent F3 and the fourth functional group F4 of the monomer or macromonomer M1-F4. Silane compound 113 also comprises substituents R4 and R5. One or both of substituents R4 and R5 may also comprise a first functional group, which is able to react with the metal oxide layer. In addition, one or both substituents R4 and R5 may also comprise a third functional group, which is able to react with the fourth functional group of the monomer or macromonomer M1-F4.

According to the second embodiment of the present invention, the polymer stabilizer layer may be formed from the reaction of one or more monomers or macromonomers having a fourth functional group and the polymerizable third functional group of the silane. Various polymerization techniques known by those skilled in the art may be applied, such as random graft polymerization (RGP), ionic random graft polymerization (IRGP), and atom transfer radical polymerization (ATRP), as described in U.S. Pat. No. 6,822,782, the contents of which are incorporated herein by reference in its entirety. As used herein throughout the specification and the claims, macromonomer means a macromolecule with one end-group that enables it to act as a monomer.

Suitable monomers for forming the polymer stabilizer layer may include, but are not limited to, styrene, α-methyl styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydoxyethyl acrylate, 2-hydroxyethyl methacrylate, dimethylaminoethyl methacrylate, lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate, 2-perfluorobutylethyl acrylate, 2,2,2 trifluoroethyl methacrylate, 2,2,3,3 tetrafluoropropyl methacrylate, 1,1,1,3,3,3-hexafluoroisopropyl acrylate, 1,1,1,3,3,3-hexafluoroisopropyl methacrylate, 2,2,3,3,3-pentafluoropropyl acrylate, 2,2,3,3-tetrafluoropropyl acrylate, 2,2,3,4,4,4-hexafluorobutyl methacrylate, and 2,2,3,3,4,4,4-heptafluorobutyl methacrylate or the like. The macromonomer may contain a terminal functional group selected from the group consisting of an acrylate group, a vinyl group, or combinations thereof.

In one embodiment of the present invention, macromonomers or polymerizable monomers are attached to the surface of the particle to form the polymer stabilizer layer via a reaction with the third functional group of the silane layer. The third functional group may be epoxy, vinyl, styrene, acryloyl, methacryloyl, methacryloxyalkyl, amino, hydroxy, carboxy, alkoxy group, and chloride. An example of a silane compound that may form the silane layer of the core-shell particle is 3-(trimethoxysilyl)propyl methacrylate, which is available commercially from Dow Chemical Company, Wilmington, Del. under the trade name Z6030. The corresponding acrylate may also be used.

Other macromonomer and silane compounds that may be used to form the core-shell particles are described in U.S. Patent Application No. 2018/0210312, the contents of which are incorporated herein by reference in its entirety.

One type of macromonomer that may be used to form a polymer stabilizer layer may be acrylate terminated polysiloxane, such as Gelest, MCR-M11, MCR-M17, or MCR-M22, for example. Another type of macromonomers which is suitable for the process is PE-PEO macromonomers, as shown below:

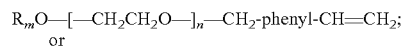
or

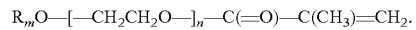

The substituent R may be a polyethylene chain, n is 1-60 and m is 1-500. The synthesis of these compounds may be found in Dongri Chao et al., Polymer Journal, Vol. 23, no. 9, 1045 (1991) and Koichi Ito et al, Macromolecules, 1991, 24, 2348. A further type of suitable macromonomers is PE macromonomers, as shown below:

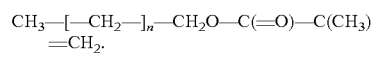

The n, in this case, is 30-100. The synthesis of this type of macromonomers may be found in Seigou Kawaguchi et al, Designed Monomers and Polymers, 2000, 3, 263.

When choosing a bifunctional compound, such as a silane comprising a first and a third functional group, to provide polymerizable or initiating functionality on the particle, attention should be paid to the relative positions of the two groups within the reagent. As should be apparent to those skilled in polymer manufacture, the rate of reaction of a polymerizable or initiating group bonded to a particle may vary greatly depending upon whether the group is held rigidly close to the particle surface, or whether the group is spaced (on an atomic scale) from that surface and can thus extend into a reaction medium surrounding the particle, this being a much more favorable environment for chemical reaction of the group. In general, it is preferred that there be at least three atoms in the direct chain between the two functional groups; for example, the aforementioned 3-(trimethoxysilyl)propyl methacrylate provides a chain of four carbon and one oxygen atoms between the silyl and ethylenically unsaturated groups, while the aforementioned 4-vinylaniline separates the amino group (or the diazonium group, in the actual reactive form) from the vinyl group by the full width of a benzene ring, equivalent to about the length of a three-carbon chain.

In any of the processes described above, the quantities of the reagents used (e.g., the organic core pigment particles, the metal oxide layer material and the material for forming the polymer stabilizer layers) may be adjusted and controlled to achieve the desired organic content in the resulting core-shell particles. Furthermore, the processes of the present invention may include more than one stage and/or more than one type of polymerization.

As noted above, the particles made according to the various embodiments of the present invention are dispersed in an encapsulation fluid. It is desirable that the polymer stabilizer layer be highly compatible with the encapsulated fluid. In practice, the suspending fluid in an electrophoretic medium is normally hydrocarbon-based, although the fluid can include a proportion of halocarbon, which is used to increase the density of the fluid and thus to decrease the difference between the density of the fluid and that of the particles. Accordingly, it is important that the polymer stabilizer layer formed in the present processes be highly compatible with the encapsulated fluid, and thus that the polymer stabilizer layer itself comprise a major proportion of hydrocarbon chains; except for groups provided for charging purposes, as discussed below, large numbers of strongly ionic groups are undesirable since they render the material of the polymer stabilizer layer less soluble in the hydrocarbon suspending fluid and thus adversely affect the stability of the particle dispersion. Also, as already discussed, at least when the medium in which the particles are to be used comprises an aliphatic hydrocarbon suspending fluid (as is commonly the case), it is advantageous for the material of polymer stabilizer layer to have a branched or "comb" structure, with a main chain and a plurality of side chains extending away from the main chain. Each of these side chains should have at least about four, and preferably at least about six, carbon atoms. Substantially longer side chains may be advantageous; for example, some of the preferred materials of the polymer stabilizer layer may have lauryl ($C_{12}$) side chains. The side chains may themselves be branched; for example, each side chain could be a branched alkyl group, such as a 2-ethylhexyl group. It is believed (although the invention is in no way limited by this belief) that, because of the high affinity of hydrocarbon chains for the hydrocarbon-based suspending fluid, the branches of the material of the polymer stabilizer layers spread out from one another in a brush or tree-like structure through a large volume of liquid, thus increasing the affinity of the particle for the suspending fluid and the stability of the particle dispersion.

There are two basic approaches to forming such a comb polymer. The first approach uses monomers, which inherently provide the necessary side chains. Typically, such a monomer has a single polymerizable group at one end of a long chain (at least four, and preferably at least six, carbon atoms). Monomers of this type, which have been found to give good results in the present processes, include hexyl acrylate, 2-ethylhexyl acrylate and lauryl methacrylate. Isobutyl methacrylate and 2,2,3,4,4,4-hexafluorobutyl acrylate have also been used successfully. In some cases, it may be desirable to limit the number of side chains formed in such processes, and this can be achieved by using a mixture of monomers (for example, a mixture of lauryl methacrylate and methyl methacrylate) to form a random copolymer in which only some of the repeating units bear long side chains. In the second approach, typified by an RGP-ATRP process, a first polymerization reaction is carried out using a mixture of monomers, at least one of these monomers bearing an initiating group, thus producing a first polymer containing such initiating groups. The product of this first polymerization reaction is then subjected to a second polymerization, typically under different conditions from the first polymerization, to cause the initiating groups within the polymer to cause polymerization of additional monomer on to the original polymer, thereby forming the desired side chains. As with the bifunctional reagents discussed above, we do not exclude the possibility that some chemical modification of the initiating groups may be effected between the two polymerizations. In such a process, the side chains themselves do not need to be heavily branched and can be formed from a small monomer, for example methyl methacrylate.

Free radical polymerization of ethylenic or similar radical polymerizable groups attached to particles may be effected at elevated reaction temperatures, preferably 60 to 70° C., using conventional free radical initiators, such as azobis (isobutyryinitrile) (AIBN), while ATRP polymerization can be effected using the conventional metal complexes, as described in Wang, J. S., et al., Macromolecules 1995, 23, 7901, and J. Am. Chem. Soc. 1995, 117, 5614, and in Beers, K. et al., Macromolecules 1999, 32, 5772-5776. See also U.S. Pat. Nos. 5,763,548; 5,789,487; 5,807,937; 5,945,491; 4,986,015; 6,069,205; 6,071,980; 6,111,022; 6,121,371; 6,124,411; 6,137,012; 6,153,705; 6,162,882; 6,191,225; and 6,197,883. The entire disclosures of these papers and patents are herein incorporated by reference. The presently preferred catalyst for carrying out ATRP is cuprous chloride in the presence of bipyridyl (Bpy).

RGP processes of the invention in which particles bearing polymerizable groups are reacted with a monomer in the presence of an initiator will inevitably cause some formation of "free" polymer not attached to a particle, as the monomer in the reaction mixture is polymerized. The unattached polymer may be removed by repeated washings of the particles with a solvent (typically a hydrocarbon) in which the unattached polymer is soluble, or (at least in the case of metal oxide or other dense particles) by centrifuging off the treated particles from the reaction mixture (with or without the previous addition of a solvent or diluent), redispersing the particles in fresh solvent, and repeating these steps until the proportion of unattached polymer has been reduced to an acceptable level. (The decline in the proportion of unattached polymer can be followed by thermogravimetric analysis of samples of the polymer.) Empirically, it does not appear that the presence of a small proportion of unattached polymer, of the order of 1 percent by weight, has any serious deleterious effect on the electrophoretic properties of the treated particles; indeed, in some cases, depending upon the chemical natures of the unattached polymer and the suspending fluid, it may not be necessary to separate the particles having attached a polymer stabilizer layer from the unattached polymer before using the particles in an electrophoretic display.

It has been found that there is an optimum range for the amount of polymer stabilizer layer which should be formed on electrophoretic particles, and that forming an excessive amount of polymer on the particles can degrade their electrophoretic characteristics. The optimum range will vary with a number of factors, including the density and size of the particles being coated, the nature of the suspending medium in which the particles are intended to be used, and the nature of polymer formed on the particles, and for any specific particle, polymer and suspending medium, the optimum range is best determined empirically. However, by way of general guidance, it should be noted that the denser the particle, the lower the optimum proportion of polymer by weight of the particle, and the more finely divided the particle, the higher the optimum proportion of polymer. In general, the particles should be coated with at least about 2, and desirably at least about 4, percent by weight of the particle. In most cases, the optimum proportion of polymer will range from about 4 to about 15 percent by weight of the particle, and typically is about 6 to about 15 percent by weight, and most desirably about 8 to about 12 percent by weight.

To incorporate functional groups for charge generation of the pigment particles, a co-monomer may be added to the polymerization reaction medium. The co-monomer may either directly charge the core-shell particles or interact with a charge control agent in the display fluid to bring a desired charge polarity and charge density to the core-shell particles. Suitable co-monomers may include vinylbenzylaminoethyl-amino-propyl-trimethoxysilane, methacryloxypropyltrimethoxysilane, acrylic acid, methacrylic acid, vinyl phosphoric acid, 2-acrylamino-2-methylpropane sulfonic acid, 2-(dimethylamino)ethyl methacrylate, N-[3-(dimethylamino)propyl]methacrylamide and the like. Suitable co-monomers may also include fluorinated acrylate or methacrylate such as 2-perfluorobutylethyl acrylate, 2,2,2 trifluoroethyl methacrylate, 2,2,3,3 tetrafluoropropyl methacrylate, 1,1,1,3,3,3-hexafluoroisopropyl acrylate, 1,1,1,3,3,3-hexafluoroisopropyl methacrylate, 2,2,3,3,3-pentafluoropropyl acrylate, 2,2,3,3-tetrafluoropropyl acrylate, 2,2,3,4,4,4-hexafluorobutyl methacrylate or 2,2,3,3,4,4,4-heptafluorobutyl methacrylate. Alternatively, charged or chargeable groups may be incorporated into the polymer via the bifunctional stabilizer used to provide polymerizable or initiating functionality to the pigment.

Functional groups, such as acidic or basic groups, may be provided in a "blocked" form during polymerization, and may then be de-blocked after formation of the polymer. For example, since ATRP cannot be initiated in the presence of acid, if it is desired to provide acidic groups within the polymer, esters such as t-butyl acrylate or isobornyl methacrylate may be used and the residues of these monomers within the final polymer hydrolyzed to provide acrylic or methacrylic acid residues.

When it is desired to produce charged or chargeable groups on the pigment particles and also polymer stabilizer layers separately attached to the particles, it may be very convenient to treat the particles (after the metal oxide coating) with a mixture of two reagents, one of which carries the charged or chargeable group (or a group which will eventually be treated to produce the desired charged or chargeable group), and the other of which carries the polymerizable or polymerization-initiating group. Desirably, the two reagents have the same, or essentially the same, functional group which reacts with the particle surface so that, if minor variations in reaction conditions occur, the relative rates at which the reagents react with the particles will change in a similar manner, and the ratio between the number of charged or chargeable groups and the number of polymerizable or polymerization-initiating groups will remain substantially constant. It will be appreciated that this ratio can be varied and controlled by varying the relative molar amounts of the two (or more) reagents used in the mixture. Examples of reagents which provide chargeable sites but not polymerizable or polymerization-initiating groups include 3-(trimethoxysilyl)propylamine, N-[3-(trimethoxysilyl)propyl]diethylenetriamine, N-[3-(trimethoxysilyl)propyl]ethylene and 1-[3-(trimethoxysilyl)propyl]urea; all these silane reagents may be purchased from United Chemical Technologies, Inc., Bristol, Pa., 19007. As already mentioned, an example of a reagent, which provides polymerizable groups but not charged or chargeable groups, is 3-(trimethoxysilyl)propyl methacrylate.

The core-shell particles of the present invention are useful in the electrophoretic field. Firstly, the shell of the particles enables the modification and control of the surface nature and charge of the organic pigment particle. Thus, different types of electrophoretic particles in a medium may be surface modified using different silane treatment, which may contribute to an effective separation and, as a result, an improved electro-optic performance. The metal oxide layer enables the covalently attachment of the silane layer onto the particle surface. Contrary to inorganic pigments, which may comprise functional groups, such as hydroxyl, that provide a reactive anchor for an organic species to be attached on their surface, most organic pigments do not contain functional groups that can be readily reacted with functional groups of typical reagents. Thus, by precipitating a layer of a metal oxide onto an organic pigment particle surface, the subsequent silane layer is strongly attached on the particle's surface and it is unlikely that it will be desorbed from the surface, increasing the effectiveness of the treatment. The same is true for surface treatments that include a polymer stabilizer layer. This layer contributes to the stability of particle dispersion because it protects against particle aggregation. Steric effects, caused by the polymer attachment on the pigment particle surfaces, prevent the particles from aggregating. The stronger the attachment, the more effective the stabilization is, because less desorption of the polymer from the particle surface is observed with stronger attachment. Thus, in the case of a covalent bond of the polymer to the particle surface, a more effective particle stabilization and improved electro-optic performance is typically observed.

The process by which the shell of the core-shell particle is formed also contributes to improved electro-optic performance. Typically, a metal oxide layer is formed by the precipitation of a metal oxide created by the reaction of a metal oxide precursor with a reagent in an organic solvent. The generated metal oxide precipitates on the surface of the pigment particle, which is present in the solvent. The liquid phase process may result in a non-uniform coating of metal oxide, which means that for a more complete surface coverage, a larger amount of metal oxide is required. On the contrary, the process disclosed herein using a fluidized bed reactor, a gaseous stream of a metal oxide precursor, and then a gaseous stream of a reagent, enables the potential formation of a uniform metal oxide layer that has a lower thickness. This translates to a better optical performance of the core-shell particle, because thicker metal oxide layer may lead to higher light reflection on the shell, which would prevent optimum light absorption by the organic pigment particle and appearance of less saturated color. The gaseous stream of the metal oxide precursor in an inert gas enables the complexation (or adsorption) of the metal oxide precursor on the surface of the organic pigment particle. The process does not favor the presence of a large excess of the precursor on the organic pigment particle, which leads to a more uniform and thin metal oxide layer.

According to one aspect of the present invention, organic pigment particles comprising a metal oxide layer may be manufactured using a fluidized bed reactor as described above. The organic pigment particles are inserted into the reactor as a powder bed and contacted with a gaseous stream comprising a precursor of metal oxide and an inert gas to form a mixture of organic pigment particles and metal precursor. The metal oxide precursor may be complexed on the organic pigment particle surface and then reacted with the reagent, providing a metal oxide coating on the surface of the organic pigment particles. The method may take place in a continuous or a batch process.

The amount of polymer stabilizer layer on the core-shell particles may be controlled. Forming an excessive amount of polymer on the particles can degrade their electrophoretic characteristics. The optimum range will vary with a number of factors, including the density and size of the organic pigment, the density and thickness of the metal oxide layer, the nature of the non-polar fluid of the electrophoretic medium, and the nature of material of the polymer stabilizer layer. It was found that the denser the particle, the lower the optimum proportion of polymer stabilizer layer by weight of the core-shell particle. In addition, the more finely divided the organic pigment core, the higher the optimum proportion of polymer stabilizer layer. The polymer stabilizer layer may be from 1 to 50 weight percent, or from 2 to 30 weight percent, or from 4 to 20, or from 5 to 15 weight percent by weight of the core-shell particle.

Figure 2:
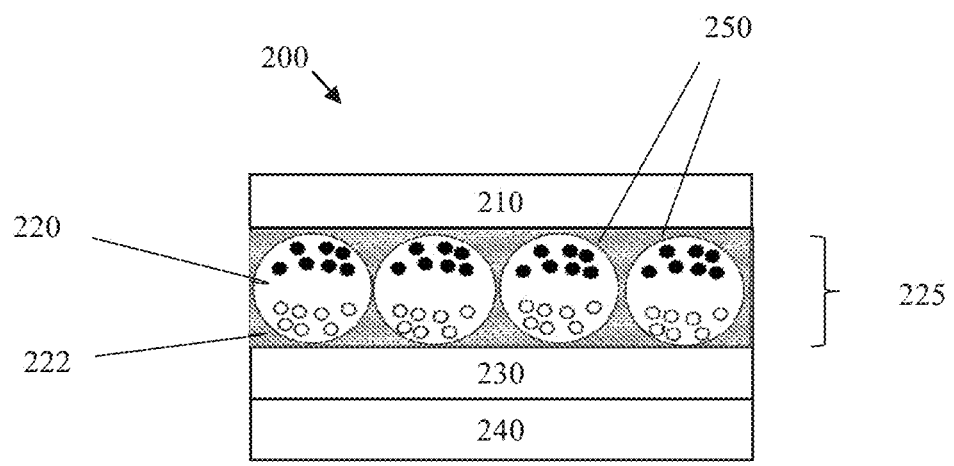
FIG. 2 is a schematic illustration of an electrophoretic device comprising an electro-optic material layer comprising encapsulated electrophoretic medium.

The electrophoretic medium of the present invention that comprises the core-shell particles can be used to form an electrophoretic device. The electrophoretic device may be an electrophoretic display, comprising an electro-optic material layer comprising the electrophoretic medium, wherein the electrophoretic medium may be encapsulated in microcapsules or microcells. An example of such an electrophoretic device 200 is illustrated in FIG. 2. In this example, the electrophoretic device comprises an electro-optic material layer 225, comprising electrophoretic medium 220, which is encapsulated in microcapsules 250. The electrophoretic device also comprises a first light transmissive electrode layer 210 and a second electrode layer 240. The second electrode layer 240 is adhered to the electro-optic material layer by an adhesive layer 230. The electrophoretic device may comprise a second adhesive layer (not shown in FIG. 2), which is used to adhere the first light-transmissive layer 210 to the electro-optic material layer 225. The electro-optic material layer 225 may comprise, in addition to microcapsules 250, a binder 222. In the example of FIG. 2, the electrophoretic medium 220 comprises two types of particles in a non-polar fluid. One or more of the types of particles may be core-shell comprising an organic pigment core, and a shell comprising a metal oxide layer and a silane layer. The particles that can be caused to move with the application of an electric field across the microcapsules 250.

Figure 3:
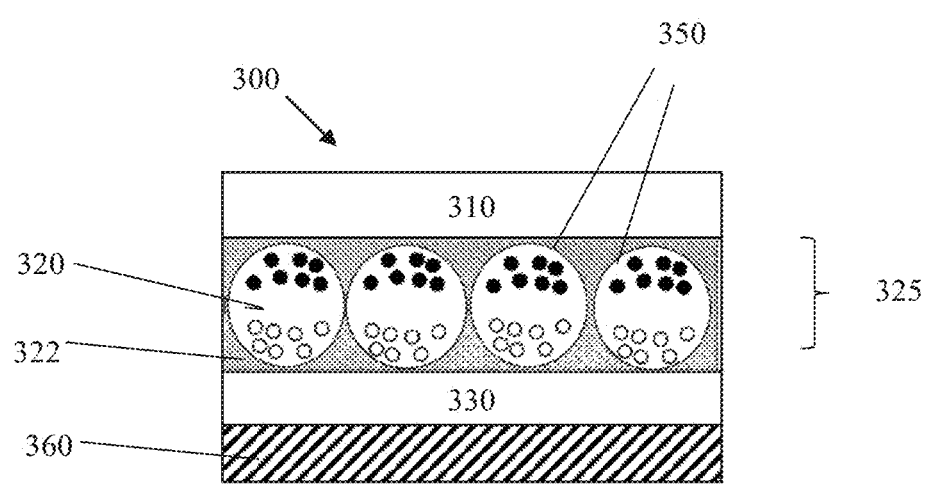
FIG. 3 is a schematic illustration of an electro-optic assembly that is a front plane laminate comprising a first light-transmissive layer, an electro-optic material layer comprising encapsulated electrophoretic medium, an adhesive layer, and a release sheet.

The electrophoretic medium of the present invention can be used to form electrophoretic assemblies, such as a front plane laminate and a double release sheet. As illustrated in FIG. 3, in some embodiments, a front plane laminate 300 comprises a light-transmissive electrode layer 310, an electro-optic material layer 325, and a release sheet 360. The release sheet 360 is adhered to the electro-optic material layer 325 by an adhesive layer 330. The electro-optic material layer 325 may comprise, in addition to microcapsules 350, a binder 322. In the example of FIG. 3, the electrophoretic medium 320 comprises two types of particles in a non-polar fluid. One or more of the types of particles may be core-shell comprising an organic pigment core, and a shell comprising a metal oxide layer and a silane layer. Removal of the release sheet 360 and connecting a backplane, comprising an electrode layer, onto the exposed surface of the electro-optic material layer 325 via the adhesive layer 330, results in the formation of an electrophoretic device.

Figure 4:
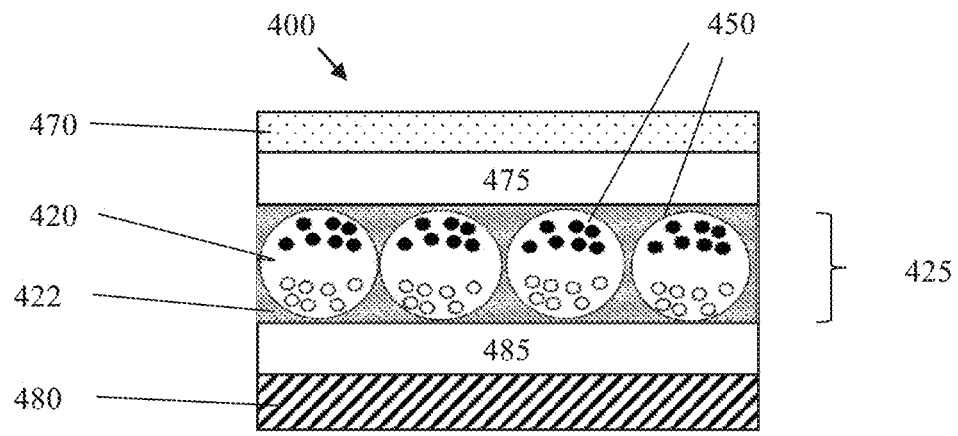
FIG. 4 is a schematic illustration of an electro-optic assembly that is a double release sheet comprising a first release sheet, a first adhesive layer, an electro-optic material layer comprising encapsulated electrophoretic medium, a second adhesive layer, and a second release sheet.

In another embodiment, as illustrated in FIG. 4, a double release sheet 400 comprises two adhesive layers (475 and 485) and two release sheets (470 and 480). Specifically, in this example, a first release sheet 470 is attached to the electro-optic material layer 425 using a first adhesive layer 475. A second release sheet 480 is attached to the electro-optic material layer 425 using a second adhesive layer 485. In the example of FIG. 4, the electrophoretic medium 420 comprises two types of particles in a non-polar fluid. One or more of the types of particles may be core-shell comprising an organic pigment core, and a shell comprising a metal oxide layer and a silane layer. Removal of the release sheet 470 and connecting a first light-transmissive electrode layer onto the exposed surface of the electro-optic material layer 425 via the adhesive layer 475, and removal of the release sheet 480 and connecting a backplane, comprising a second electrode, onto the exposed surface of the other side of the electro-optic material layer 425, results in the formation of an electrophoretic device.

In another embodiment, the electrophoretic medium of the present invention can be used to form an electro-optic assembly, wherein the electro-optic assembly is an inverted front plane laminate. The inverted front plane laminate comprises in order (i) a first electrode layer, (ii) a first adhesive layer, (iii) an electro-optic material layer comprising an encapsulated electrophoretic medium, and (iv) and a release sheet. The inverted front plane laminate may also comprise a second adhesive layer between the electro-optic material layer and the electro-optic material layer. The inverted front plane laminate can be converted to an electro-optic device by removing the release sheet and connecting a second electrode layer onto the exposed electro-optic material layer (or onto the second adhesive lay.

The electrophoretic medium of the electrophoretic device or the electrophoretic assemblies of the present inventions comprise a plurality of at least one type of the disclosed core-shell particles. The electrophoretic medium may further comprise a plurality of another type of core-shell particles or a different type of charged electrophoretic particles. The electrophoretic medium may also comprise more than two types of core-shell particles or other types of charged electrophoretic particles. The different types of core-shell particles may have different colors.

The non-polar fluid, in which the electrophoretic particles are dispersed, may be clear and colorless. It preferably has a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzoic fluoride, chloropentafluoro-benzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoro-ethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-corning (DC-200).

The content of the electrophoretic particles in the non-polar fluid may vary. For example, one type of particles may take up 0.1% to 50%, preferably 0.5% to 15%, by volume of the non-polar fluid.

EXAMPLES

Examples of the present invention is described below. The present invention is not limited to the Examples.

Example 1

Pigment Red 122 particles with a metal oxide layer: An amount of 151.2 g of Pigment Red 122 powder (a quinacridone pigment supplied as Ink Jet Magenta E 02 by Clariant, Basel, Switzerland) was loaded into a fluidized bed reactor which was fed with trimethylaluminum in a nitrogen stream and then with a water/nitrogen stream. The resulting particles were dried to provide Pigment Red 122 particles having an aluminum oxide layer of approximately 1 nm in thickness.

Example 2

Pigment Red 122 particles with a metal oxide layer and a silane layer: Into a 100 mL plastic bottle were added (a) 10.0 g of the Pigment Red 122 particles with a metal oxide layer from Example 1, (b) 40 g of ethanol, (c) 0.5 g of de-ionized water and (d) 100 g of zirconia beads (1.7-2.4 mm). This mixture was placed on a roll mill and mixed for approximately 16 hours. Then, the dispersion was filtered through a 200 micron mesh into a round bottom flask. This is Sample A.

Into a separate 100 mL plastic bottle were added 7.1 g of a 40 weight % solution of vinylbenzylaminoethylaminopropyltrimethoxysilane in methanol, (supplied by Dow as Xiameter OFS-6032 silane), 1.6 g of de-ionized water and 0.6 g of glacial acetic acid. This mixture was placed on a roll mill for one hour. This is Sample B.

Sample B was then added into the flask, containing Sample A. The pH of the mixture was adjusted to 9 using a 0.1M solution of ammonium hydroxide. The resulting dispersion was stirred at room temperature using an overhead mixer for 60 minutes and 30 g of ethanol were added into the flask. The resulting mixture was centrifuged at 5000 rpm for 30 minutes. The supernatant liquid was decanted and the remaining material was dried overnight at 70° C. using a vacuum oven. This is Sample C.

Example 3

Core-Shell particles with a metal oxide layer, a silane layer, and a polymer stabilizer layer: Into a 250 mL plastic bottle were added (a) 10 g of Sample C particles from Example 2, (b) 72.5 g of toluene and (c) 13.3 g of lauryl methacrylate (LMA). The dispersion was mixed using an IKA Ultra Turrax mixer at 12,000 rpm for 1 hour. Then, the dispersion was transferred into a round bottom flask, which was purged with nitrogen and heated to 65° C. After one hour of heating at to 65° C., an initiator solution comprising 0.2 g of 2,2'-azobis(2-methylpropionitrile) (AIBN) in 4.2 g of toluene was rapidly injected into the flask and the reaction was allowed to proceed for 16 hours. The resulting dispersion was collected in a 1-L plastic bottle and centrifuged at 4500 rpm for 30 minutes. The supernatant liquid was discarded. The remaining material was mixed with 200 mL of toluene and the supernatant liquid was discarded. The rinsing with toluene, the centrifugation and removal of the supernatant liquid was performed one more time. Then, the remaining material was collected and dried in a 70° C. vacuum oven overnight. The resulting solid particles is Sample D.

Example 4

Electrophoretic medium: Into a 100 mL container were added (a) 8.65 g of particles from Sample D, (b) 36.9 g of isoparaffin hydrocarbon solvent (Isopar E, supplied by ExxonMobil), and (c) 2.47 g of a 70 wt % solution of CCA041. This mixture was sonicated for 90 minutes and then mixed in a rolled for one hour. The sonication and mixing were repeated 10 times. Then, the dispersion was filtered through a 200 micron mesh.

Example 5

Pigment Red 122 particles with a metal oxide layer and a silane layer: Into a 100 mL plastic bottle were added (a) 10.0 g of the Pigment Red 122 particles with a metal oxide layer from Example 1, (b) 40 g of ethanol, (c) 0.5 g of de-ionized water and (d) 100 g of zirconia beads (1.7-2.4 mm). This mixture was placed on a roll mill and mixed for approximately 16 hours. Then, the dispersion was filtered through a 200 micron mesh into a round bottom flask. This is Sample E.

Into a separate 100 mL plastic bottle were added 4.7 g of methacryloxypropyl trimethoxysilane, (supplied by Dow as Xiameter OFS-6030 silane), 1.6 g of de-ionized water and 0.6 g of glacial acetic acid. This mixture was agitated on a roll mill for one hour. This is Sample F.

Sample F was then added into the flask containing Sample E. The pH of the mixture was adjusted to 9 using a 0.1M solution of ammonium hydroxide. The resulting dispersion was stirred at room temperature using an overhead mixer for 60 minutes and 30 g of ethanol were added into the flask. The resulting mixture was centrifuged at 5000 rpm for 30 minutes. The supernatant liquid was decanted and the remaining material was dried overnight at 70° C. using a vacuum oven. This is Sample G.

Example 6

Electrophoretic medium: Into a 100 mL container were added (a) 8.65 g of particles from Sample G, (b) 36.9 g of isoparaffin hydrocarbon solvent (Isopar E, supplied by ExxonMobil), and (c) 2.47 g of a 70 wt % solution of CCA041. This mixture was sonicated for 90 minutes and then mixed in a rolled for one hour. The sonication and mixing were repeated 10 times. Then, the dispersion was filtered through a 200 micron mesh.

Example 7

Control Sample of Pigment Red 122 (supplied by Clariant, Basel, Switzerland, as Ink Jet Magenta E 02) was modified with vinylbenzyl chloride and lauryl methacrylate polymer as described in U.S. Patent Application 2014/0340430 (Example 1).

Thermogravimetric Analysis: The extent of silane-polymer attachment was assessed using thermogravimetric analysis (TGA). Over a temperature range of 115-365° C., a relative mass loss of 13.6% was observed for Sample D of Example 3 and 11.0% for Sample G of Example 5. By contrast, a mass loss of just 3.6% was observed over the same temperature range for the unmodified Pigment Red 122 Ink Jet Magenta E 02. These results indicate that the silane and polymer are successfully bonded to the pigment surface.

Zeta Potential Measurement: Zeta potential values of the pigment samples were measured by titration of the corresponding pigment dispersions in Isopar E using a standard solution of a charge control agent in Isopar E and a Colloidal Dynamics ZetaProbe.

Figure 5:
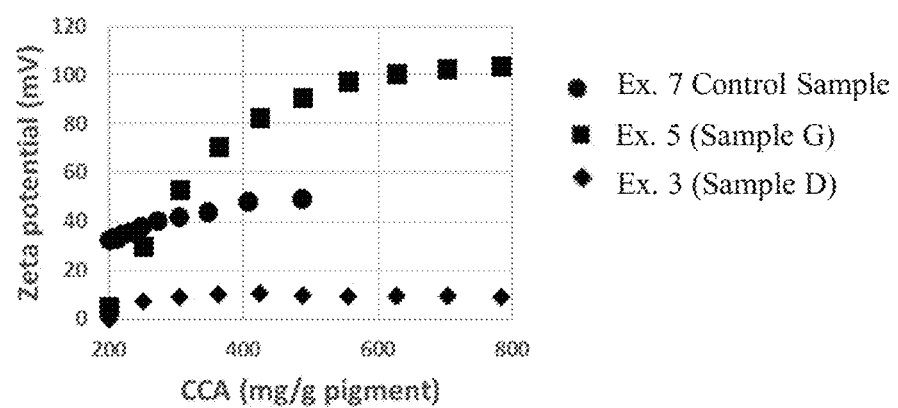
FIG. 5 shows the reaction scheme for the formation of a core-shell particle comprising an organic pigment particle and a shell comprising a metal oxide layer, a silane layer, and a polymer stabilizer layer.

Results of zeta potential measurements for pigment particles from Example 3 (Sample D), Example 5 (Sample G) and Example 7 (Control) are provided in the Graph of FIG. 5. The data of FIG. 5 indicate that Pigment 122 functionalized with aluminum oxide—vinylbenzylaminoethylaminopropyltrimethoxysilane—lauryl methacrylate, prepared in Example 3, has a zeta potential plateau of ~105 mV. Pigment 122 functionalized with aluminum oxide—methacryloxypropyl trimethoxysilane—lauryl methacrylate, prepared in Example 6, has a zeta potential plateau of ~8 mV. This demonstrates that zeta potential can be tuned over a broad range for the pigment comprising a metal oxide layer with systematic changes to the functionalization materials. By contrast, the zeta potential of Pigment Red 122 functionalized with vinylbenzyl chloride-lauryl methacrylate (without a metal oxide layer) has a plateau at ~50 mV.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

All of the contents of the aforementioned patents and applications are incorporated by reference herein in their entireties.

What is claimed is:

1. An electrophoretic medium comprising a plurality of a first type of core-shell particles and a non-polar fluid, wherein each of the plurality of the first type of the core-shell particles comprises:
   a core comprising an organic pigment;
   a shell comprising a metal oxide layer and a silane layer;
   wherein the metal oxide layer is formed on the surface of the organic pigment using a fluidized bed reactor by inserting the organic pigment into the reactor as a powder bed, contacting the powder bed with a gaseous stream comprising an inert gas and a metal oxide precursor, and contacting the powder bed with a gaseous stream of an inert gas and a reagent that reacts with the metal oxide precursor to form a metal oxide; and
   wherein the silane layer is formed from a silane compound comprising a first functional group and a second functional group, wherein the first functional group reacts with the metal oxide, and the second functional group is selected from the group consisting of a carboxy group, a sulfate group, a sulfonate group, a phosphate group, and a phosphonic group.

2. The electrophoretic medium according to claim 1, wherein the shell further comprises a polymer stabilizer layer, wherein the polymer stabilizer layer is formed from the reaction of the silane layer and a monomer or macromonomer, wherein the silane compound comprises a third functional group, wherein the monomer or macromonomer comprises a fourth functional group, and wherein the third functional group of the silane compound reacts with the fourth functional group of the monomer or macromonomer.

3. The electrophoretic medium according to claim 2, wherein the third functional group of the silane compound is selected from the group consisting of epoxy, vinyl, styrene, acryloyl, methacryloyl, methacryloxyalkyl, amino, hydroxy, carboxy, alkoxy group, and chloride.

4. The electrophoretic medium according to claim 1, wherein the fourth functional group of the monomer or macromonomer is selected from the group consisting of vinyl, styrene, acryloyl, methacryloyl, methacryloxyalkyl, epoxy, amino, hydroxy, carboxy, and chloride.

5. The electrophoretic medium according to claim 1, wherein the metal oxide layer comprises aluminum oxide, silica, titanium dioxide, zirconium oxide, zinc oxide or mixtures thereof.

6. The electrophoretic medium according to claim 1, wherein the first functional group is selected from the group consisting of alkoxy, alkylamino, halide, hydrogen, and hydroxy.

7. The electrophoretic medium according to claim 1, wherein the metal oxide precursor is selected from the group consisting of trimethylaluminum, triethylaluminum, dimethylaluminum chloride, diethylaluminum chloride, trimethoxyaluminum, triethoxyaluminum, dimethylaluminum propoxide, aluminum triisopopoxide, tributoxy aluminum, tris(dimethylamino) aluminum, tris(diethylamino) aluminum, tris(propylamino) aluminum, aluminum trichloride, trichlorosilane, hexachlorodisilane, silicon tetrachloride, tetramethoxysilane, tetraethoxysilane, tris(tert-pentoxy)silanol, tetraisocyanatesilane, silicon tertrachoride, tris(methylamino)silane, tris(ethylamino)silane, titanium tetrachloride, titanium tetraiodide, tetramethoxy titanium, tetraethoxy titanium, titanium isopropoxide, tetrakis(methylamino) titanium, tetrakis(ethylamino) titanium, dimethyl zinc, diethyl zinc, methyl zinc isopropoxide, zirconium tetrachloride, zirconium tetraiodide, tetramethoxy zirconium, tetraethoxy zirconium, tetraisopropoxy zirconium, tetrabutoxy zirconium, tetrakis(methylamino) zirconium, tetrakis(ethylamino) zirconium, and mixtures thereof.

8. The electrophoretic medium according to claim 1, wherein the reagent is selected from the group consisting of water, oxygen, ozone, and mixture thereof.

9. The electrophoretic medium according to claim 1, wherein the metal oxide layer has thickness of from about 0.5 nm to about 2 nm.

10. The electrophoretic medium according to claim 1, wherein the organic pigment is selected from the group consisting of an azo pigment, a phthalocyanine pigment, a quinacridone pigment, a perylene pigment, a diketopyrrolopyrrole pigment, a benzimidazolone pigment, an isoindoline pigment, an anthranone pigment, an indanthrone pigment, a carbon black pigment, a rhodamine pigment, a benzinamine pigment, a carbon black pigments, and mixtures therein.

11. The electrophoretic medium according to claim 1, wherein the organic pigment is selected from the group consisting of C.I. Pigment Blue 15, 15:1, 15:2, 15:3, 15:4 15:6, 60, and 79; Pigment Red 2, 4, 5, 9, 12, 14, 38, 48:2, 48:3, 48:4, 52:2, 53:1, 57:1, 81, 112, 122, 144, 146, 147, 149, 168, 170, 176, 177, 179, 184, 185, 187, 188, 208, 209, 210, 214, 242, 254, 255, 257, 262, 264, 282, and 285; C.I.

Pigment Violet 1, 19, 23, and 32; C.I. Pigment Yellow 1, 3, 12, 13, 14, 15, 16, 17, 73, 74, 81, 83, 97, 109, 110, 111, 120, 126, 127, 137, 138, 139, 150, 151, 154, 155, 174, 175, 176, 180, 181, 184, 191, 194, 213 and 214; C.I. Pigment Green 7, and 36; C.I. Pigment Black 1, and 7; C.I. Pigment Brown 25, 32, 41; Pigment Orange 5, 13, 34, 36, 38, 43, 61, 62, 64, 68,67, 72, 73, and 74, and mixtures thereof.

12. An electrophoretic device comprising
a first light-transmissive electrode layer;
an electro-optic material layer comprising encapsulated electrophoretic medium; and
a second electrode layer;
wherein the electrophoretic medium is the electrophoretic medium of claim 1.

13. An electrophoretic assembly comprising in order:
a first light-transmissive electrode layer;
an electro-optic material layer comprising encapsulated electrophoretic medium;
an adhesive layer; and
a release sheet;
wherein the electrophoretic medium is the electrophoretic medium of claim 1.

14. An electrophoretic assembly comprising in order:
a first release sheet;
a first adhesive layer;
an electro-optic material layer comprising encapsulated electrophoretic medium;
an adhesive layer;
a second adhesive layer; and
a second release sheet;
wherein the electrophoretic medium is the electrophoretic medium of claim 1.

* * * * *